United States Patent
Ikeda

(10) Patent No.: US 10,599,015 B2
(45) Date of Patent: Mar. 24, 2020

(54) IMAGE-CAPTURING APPARATUS, ACCESSORY APPARATUS AND COMMUNICATION CONTROL METHOD THEREFOR

(71) Applicant: CANON KABUSHIKI KAISHA, Tokyo (JP)

(72) Inventor: Shunichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 15/679,337

(22) Filed: Aug. 17, 2017

(65) Prior Publication Data
US 2018/0059513 A1    Mar. 1, 2018

(30) Foreign Application Priority Data

Aug. 26, 2016 (JP) .................. 2016-165619

(51) Int. Cl.
| G03B 17/14 | (2006.01) |
| G02B 27/64 | (2006.01) |
| G03B 17/56 | (2006.01) |
| H04N 5/232 | (2006.01) |
| G02B 7/28  | (2006.01) |

(52) U.S. Cl.
CPC ............. *G03B 17/14* (2013.01); *G02B 27/64* (2013.01); *G03B 17/565* (2013.01); *H04N 5/23264* (2013.01); *G02B 7/282* (2013.01); *G02B 27/646* (2013.01); *G03B 2205/0007* (2013.01)

(58) Field of Classification Search
CPC ..................................................... G03B 17/14
USPC ....................................... 396/529; 348/208.4
See application file for complete search history.

(56) References Cited

U.S. PATENT DOCUMENTS 4,845,522 A * 7/1989 Kataoka .................. G03B 17/14
396/439

FOREIGN PATENT DOCUMENTS

| CN | 1753457 A   | 3/2006 |
| CN | 101141510 A | 3/2008 |
| CN | 103608723 A | 2/2014 |
| CN | 104054022 A | 9/2014 |

(Continued)

OTHER PUBLICATIONS

The above references were cited in a Dec. 3, 2019 Chinese Office Action, a copy of which is enclosed with an English Translation, that issued in Chinese Patent Application No. 201710741440.6.

*Primary Examiner* — Clayton E. LaBalle
*Assistant Examiner* — Fang-Chi Chang
(74) *Attorney, Agent, or Firm* — Cowan, Liebowitz & Latman, P.C.

(57) ABSTRACT

The present invention provides as an aspect thereof an accessory apparatus detachably attachable to an image-capturing apparatus. The accessory apparatus includes an accessory communicator configured to enable communication with the image-capturing apparatus, and an accessory controller configured to perform the communication with the image-capturing apparatus through the accessory communicator. The accessory controller is configured, in response to detecting an error in the communication, to transmit an error notice that notifies the image-capturing apparatus of the error, and to perform a communication restoration process for restoring the communication, without waiting for a response to the error notice from the image-capturing apparatus.

17 Claims, 12 Drawing Sheets

(56) References Cited

FOREIGN PATENT DOCUMENTS

| JP | 2012-168329 A | 9/2012 |
|----|---------------|--------|
| JP | 2014-039131 A | 2/2014 |

\* cited by examiner

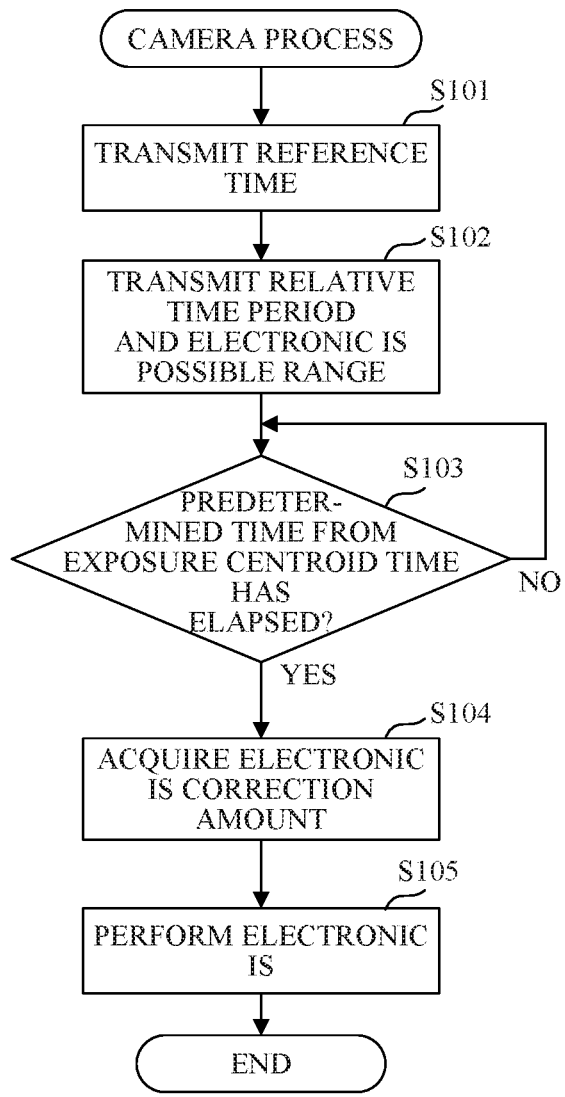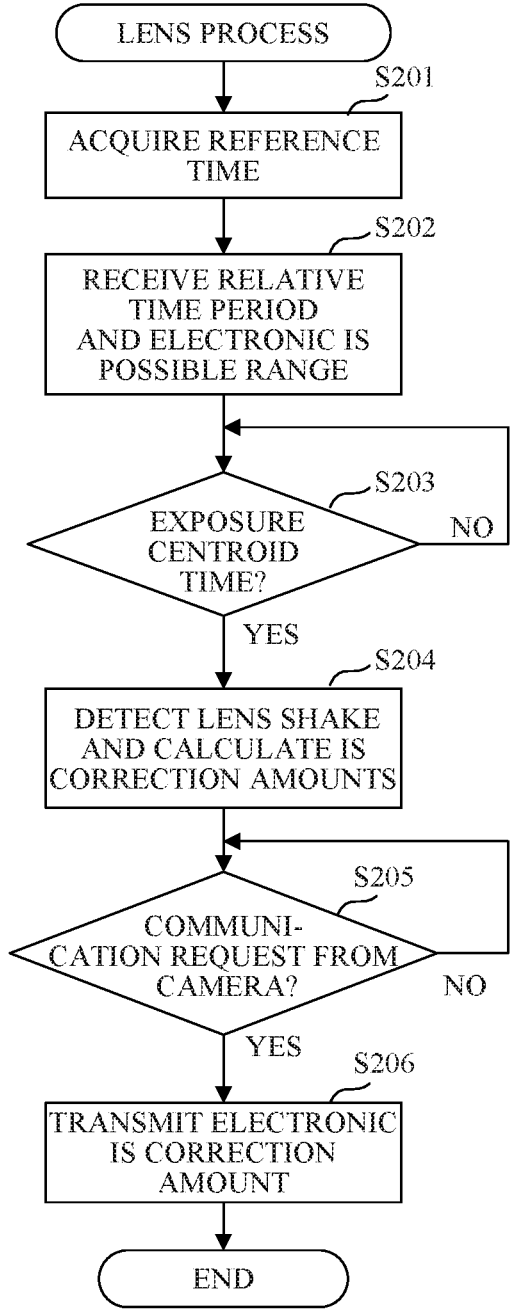
FIG. 5
FIG. 6

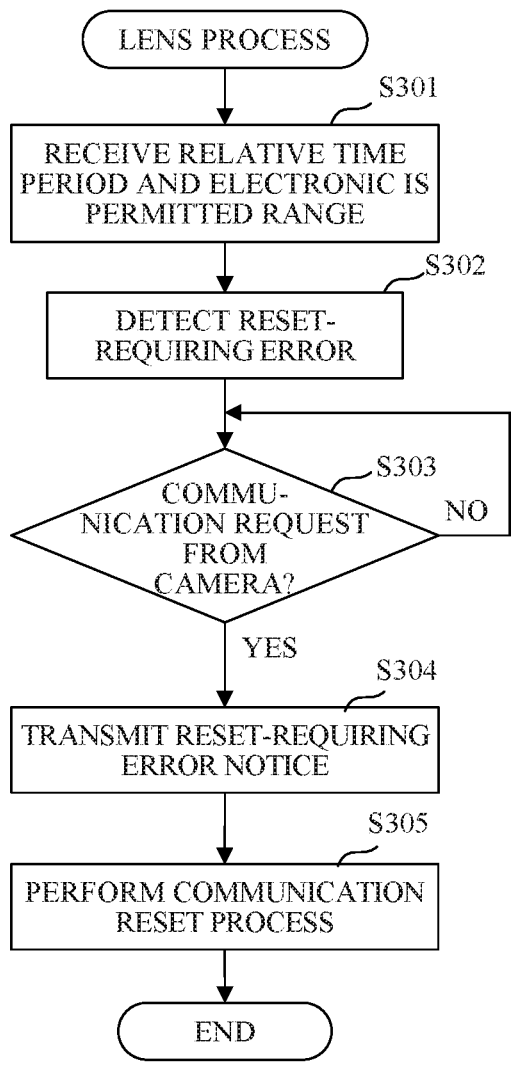
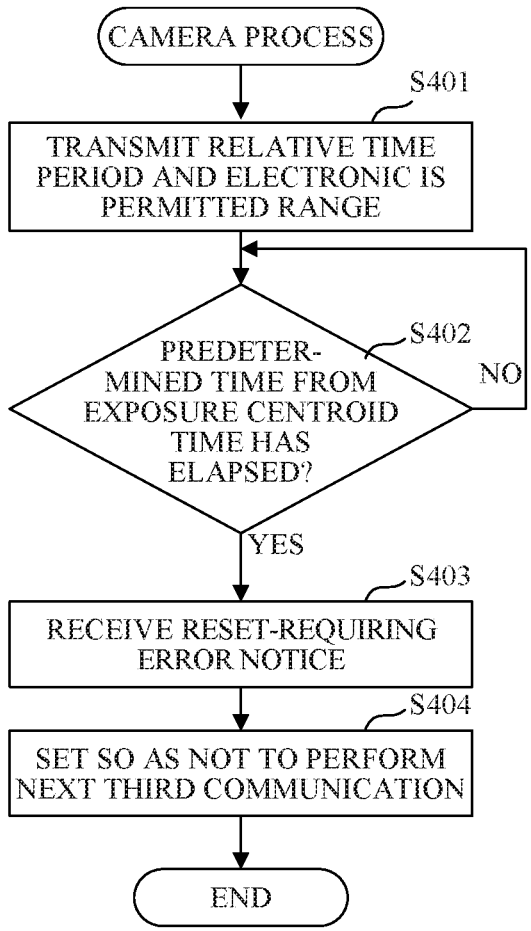
FIG. 8
FIG. 9

IMAGE-CAPTURING APPARATUS, ACCESSORY APPARATUS AND COMMUNICATION CONTROL METHOD THEREFOR

BACKGROUND OF THE INVENTION

Field of the Invention

The present invention relates to an image-capturing apparatus (hereinafter referred to as "a camera body") and an accessory apparatus such as an interchangeable lens (hereinafter referred to as "a lens unit"), which are communicably connected with each other.

Description of the Related Art

A camera system is proposed in which, in order to reduce (correct) image blur due to a camera shake caused by user's hand jiggling, a lens unit performs optical image stabilization and a camera body performs optical or electronic image stabilization. In such a camera system, it is desirable that the lens unit and the camera body cooperatively perform image stabilization control through communication therebetween to enhance an image stabilization effect.

Japanese Patent Laid-Open No. 2014-039131 discloses a camera system in which a lens unit that performs optical image stabilization using output of a gyro sensor and a camera body that performs electronic image stabilization using motion vectors cooperatively perform image stabilization control. In the camera system, the camera body transmits information on an exposure time period (shutter speed) to the lens unit, and the lens unit sets multiple times of detecting a position of an image-stabilizing shiftable lens depending on the shutter speed information. The lens unit transmits data of a difference between a target position of the shiftable lens and each detected position thereof, and the camera performs the electronic image stabilization using the difference data and the motion vectors.

Furthermore, Japanese Patent Laid-Open No. 2012-168329 discloses a camera system in which, in response to a change of an optical configuration of a lens unit in a state where the lens unit is connected to a camera body, the lens unit communicates with the camera body to provide thereto data of the change of the optical configuration.

In such camera systems, when a communication error has occurred, such as a difference of communication times between the camera body and the lens unit, it is necessary that the camera body and the lens unit each perform a communication reset process for resetting the communication. The camera body that cannot receive data from the lens unit during the communication reset process needs to quickly return to a communication-enabled state.

However, in a case where the camera body as a communication master also controls the communication reset process of the lens unit as a communication slave, it takes a long time to complete the communication reset process. Japanese Patent Laid-Open No. 2014-039131 does not disclose an operation when such a communication error occurs. On the other hand, Japanese Patent Laid-Open No. 2012-168329 discloses a process in which the lens unit transmits a communication error signal to the camera body to urge the camera body to perform an initialization communication. However, such a process takes a long time to return from the communication error.

SUMMARY OF THE INVENTION

The present invention provides an accessory apparatus (such as a lens unit) and an image-capturing apparatus (camera body) each capable of quickly returning from a communication error state to a communication-enabled state.

The present invention provides as an aspect thereof an accessory apparatus detachably attachable to an image-capturing apparatus. The accessory apparatus includes an accessory communicator configured to enable communication with the image-capturing apparatus, and an accessory controller configured to perform the communication with the image-capturing apparatus through the accessory communicator. The accessory controller is configured, in response to detecting an error in the communication, to transmit an error notice that notifies the image-capturing apparatus of the error, and to perform a communication restoration process for restoring the communication, without waiting for a response to the error notice from the image-capturing apparatus.

The present invention provides as another aspect thereof an image-capturing apparatus to which an accessory apparatus is detachably attachable. The image-capturing apparatus includes a camera communicator configured to enable communication with the accessory apparatus, and camera controller configured to perform the communication with the accessory apparatus through the camera communicator. The camera controller is configured, in response to receiving from the accessory apparatus an error notice that notifies the camera controller of an error in the communication, to allow the accessory apparatus to perform a communication restoration process for restoring the communication, without transmitting a response to the error notice to the accessory apparatus.

The present invention provides as yet another aspect thereof an image-capturing system including the above accessory apparatus and the above image-capturing apparatus.

The present invention provides as still another aspect thereof a communication control method for an accessory apparatus detachably attachable to an image-capturing apparatus. The method includes a step of causing the accessory apparatus to perform communication with the image-capturing apparatus; and a step of causing the accessory apparatus, in response to detecting an error in the communication, to transmit an error notice that notifies the image-capturing apparatus of the error, and to perform a communication restoration process for restoring the communication, without causing the accessory apparatus to wait for a response to the error notice from the image-capturing apparatus.

The present invention provides as further another aspect thereof a communication control method for an image-capturing apparatus to which an accessory apparatus is detachably attachable. The method includes a step of causing the image-capturing apparatus to perform communication with the accessory apparatus, and a step of causing the image-capturing apparatus, in response to receiving from the accessory apparatus an error notice that notifies the camera controller of an error in the communication, to allow the accessory apparatus to perform a communication restoration process for restoring the communication, without causing the image-capturing apparatus to transmit a response to the error notice to the accessory apparatus.

The present invention provides as yet further another aspect thereof a non-transitory storage medium storing a computer program for causing a computer to execute the above control method.

Further features of the present invention will become apparent from the following description of exemplary embodiments with reference to the attached drawings.

BRIEF DESCRIPTION OF THE DRAWINGS

FIG. 5 is a flowchart of a communication process of the camera body.

FIG. 6 is a flowchart of a communication process of the lens unit.

FIG. 8 is a flowchart of a communication process performed by the lens unit in Embodiment 1.

FIG. 9 is a flowchart of a communication process performed by the camera body in Embodiment 1.

DESCRIPTION OF THE EMBODIMENTS

Exemplary embodiments of the present invention will be described below with reference to the accompanied drawings.

First, description will be made of matters common to embodiments described later.

Figure 1:
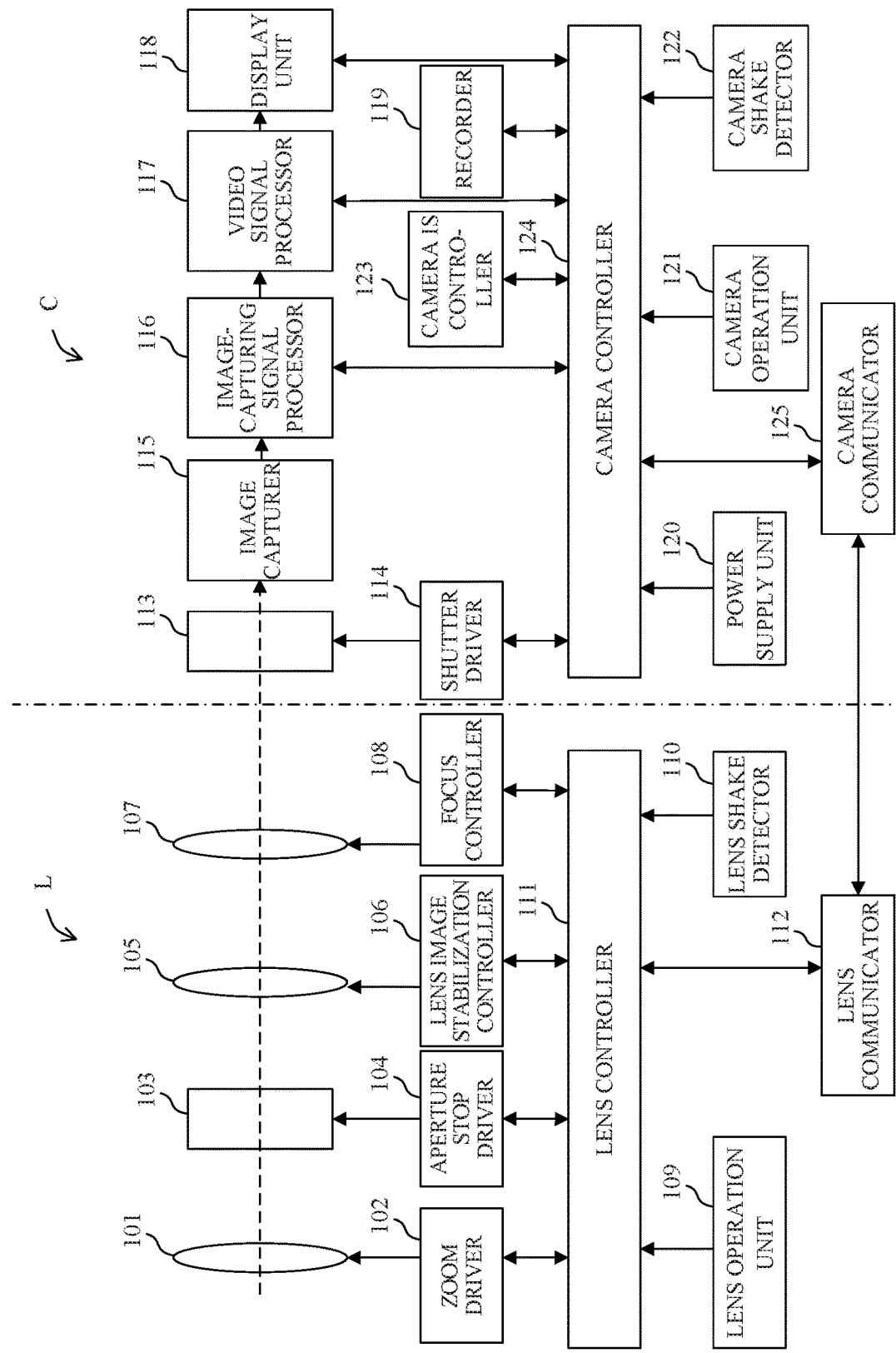
FIG. 1 is a block diagram of a configuration of an image-capturing system that is an embodiment of the present invention, which includes a camera body and a lens unit.

FIG. 1 illustrates a configuration of an image-capturing system (hereinafter referred to as "a camera system") as a representative embodiment of the present invention. This camera system is a lens-interchangeable camera system performing still image capturing and moving image capturing. The camera system includes a lens unit (interchangeable lens) L that is a lens apparatus as an accessory apparatus and a camera body C as an image-capturing apparatus. The lens unit L is detachably attached and communicably connected to the camera body C.

In the lens unit L, a magnification-varying lens 101 is moved in an optical axis direction in which an optical axis of the lens unit (that is, of an image-capturing optical system described later) L for variation of magnification. A zoom driver 102 drives the magnification-varying lens 101 in response to receiving a zoom instruction from a lens controller 111 as an accessory controller. An aperture stop 103 changes its aperture diameter to adjust an amount of light passing therethrough. An aperture stop driver 104 drives the aperture stop 103 in response to receiving an aperture stop instruction from the lens controller 111. A shift lens (hereinafter referred to as "a correction lens") 105 as an image-stabilizing optical element is moved (shifted) in directions orthogonal to the optical axis direction to perform optical image stabilization for reducing image blur due to a lens shake (or a camera shake) described later. A lens image stabilization controller 106 controls, in response to receiving a shift instruction from the lens controller 111, the shift of the correction lens 105, that is, the optical image stabilization. The lens image stabilization controller 106 and the correction lens 105 constitute a lens image stabilizer (accessory image stabilizer).

A focus lens 107 is moved in the optical axis direction for focusing. A focus controller 108 controls driving of the focus lens 107 in response to receiving a focus instruction from the lens controller 111. The magnification-varying lens 101, the aperture stop unit 103, the correction lens 105 and the focus lens 107 constitute the image-capturing optical system.

A lens operation unit 109 includes various switches and the like that are operable by a user. A lens shake detector (accessory shake detector) 110 detects a lens shake (angular velocity) as an accessory shake added to the lens unit L due to user's hand jiggling, and outputs a lens shake signal indicating the lens shake to the lens controller 111. The lens controller 111 includes a CPU and others, and controls whole operations of the lens unit L. Furthermore, the lens controller 111 communicates with a camera controller 124 provided in the camera body C through a lens communicator (accessory communicator) 112 provided in the lens unit L and a camera communicator 125 provided with the camera body C. The lens communicator 112 and the camera communicator 125 each have a communication circuit that enables transmission and receipt of notices and information (data) between the lens controller 111 and the camera controller 124 through multiple communication channels.

The camera body C includes a shutter 113 and an image capturer 115. The shutter 113 is opened and closed by a shutter driver 114 that receives a shutter instruction from the camera controller 124. Thereby, exposure of the image capturer 115 is controlled. The image capturer 115 includes an image sensor such as a CMOS sensor, and photoelectrically converts an object image formed by the image-capturing optical system to output an image-capturing signal as an electrical signal.

An image-capturing signal processor 116 performs various image processes on the image-capturing signal output from the image capturer 115 to produce a video signal. A video signal processor 117 performs on the video signal a process corresponding to its use. A camera image stabilization (IS) controller 123 sets an area to be clipped from the video signal (the area is hereinafter referred to as "a video clip area") for performing the electronic image stabilization. The video signal processor 117 performs a clip process for clipping the video clip area from the entire video image produced by the image-capturing signal processor 116.

The camera image stabilization controller 123 changes (shifts) a position of the video clip area depending on a camera shake signal or on a final electronic image stabilization correction amount described later, thereby performing the electronic image stabilization. The camera image stabilization controller 123 and the video signal processor 117 constitute a camera image stabilizer.

Although this embodiment describes a case where the electronic image stabilization is performed in the camera body C, optical image stabilization may be performed by shifting the image sensor in a plane orthogonal to the optical axis in the camera body C.

A display unit 118 displays an output video corresponding to the video signal output from the video signal processor 117. A recorder 119 stores (records) various data such as data of the video signal. A power supply unit 120 supplies electric power to the entire camera body C and lens unit L. A camera operation unit 121 includes various switches and others operable by the user, and outputs operation signals corresponding to user's operations to the camera controller 124. A camera shake detector 122 detects the camera shake (angular velocity) added to the camera body C due to the user's hand jiggling, and outputs the camera shake signal corresponding to the camera shake to the camera controller 124. A camera system controller (hereinafter referred to as "a camera controller") 124 includes a CPU and others, and controls the entire camera system. As described above, the camera controller 124 communicates with the lens controller 111 through the camera communication controller 125 and the lens communication controller 112 in the lens unit L. That is, in a state where the lens unit L is attached and electrically connected to the camera body C, the lens controller 111 and the camera controller 124 communicate with each other through the lens communication controller 112 and the camera communication controller 125.

Next, description will be made of operations of the camera system configured as above. The lens operation unit 109 includes a lens image stabilization switch for selecting on and off of the optical image stabilization. The optical image stabilization is controlled by the lens image stabilization controller 106 depending on the lens shake signal output from the lens shake detector 110. On the other hand, the camera operation unit 121 includes a camera image stabilization switch for selecting on and off of the electronic image stabilization. The electronic image stabilization is controlled by the camera image stabilization controller 123 depending on the camera shake signal output from the camera shake detector 122.

A user's on-operation of the lens or camera image stabilization switch causes the lens controller 111 or the camera controller 124 to instruct the lens image stabilization controller 106 or the camera image stabilization controller 123 to perform an image stabilization operation. The lens image stabilization controller 106 or the camera image stabilization controller 123 performs, in response to receiving this instruction, control (image stabilization control) of an optical image stabilization operation as an accessory image stabilization operation or an electronic image stabilization operation as a camera image stabilization operation.

Furthermore, the camera operation unit 121 includes an image stabilization mode selection switch for selecting, as an image stabilization mode, a first image stabilization mode and a second image stabilization mode. The first image stabilization mode is a mode in which only the optical image stabilization is performed, and the second image stabilization mode is a mode in which the optical image stabilization and the electronic image stabilization are performed in combination with each other. In the first image stabilization mode, the video clip area clipped by the video signal processor 117 is fixed to an area wider than that in the second image stabilization mode, and thereby a wider angle video signal can be output.

On the other hand, in the second image stabilization mode, the video clip area clipped by the video signal processor 117 is narrower than that in the first image stabilization mode. However, the video clip area can be shifted further widely than in the first image stabilization mode, and thereby a larger image blur can be corrected.

The camera operation unit 121 includes a shutter release switch in which a pushing operation sequentially turns on a first switch (SW1) and a second switch (SW2). A user's first stroke pushing operation turns on the SW1, and then a user's second stroke operation turns on the SW2. In response to the turning-on of the SW1, the camera controller 124 drives the focus lens 107 through the lens controller 111 and the focus driver 108 to perform autofocus. Furthermore, in response to the turning-on of the SW1, the camera controller 124 drives the aperture stop 103 through the lens controller 111 and the stop driver 104 to appropriately adjust the light amount. Then, in response to the turning-on of the SW2, the camera controller 124 causes the image capturer 115 to photoelectrically convert the object image, and causes the image-capturing signal processor 116 to produce the video signal (video data). During the image capturing, when the lens image stabilization switch or the camera image stabilization switch is turned on, the optical image stabilization or the electronic image stabilization is performed as described above. The video data thus produced in recorded by the recorder 119.

Moreover, the camera operation unit 121 includes a movie recording switch. In response to a use's operation of this movie recording switch, the camera controller 124 starts recording moving image capturing. In response to another user's operation of the movie recording switch, the camera controller 124 ends recording the moving image capturing. During the moving image capturing, in response to turning-on of the SW1 and the SW2 by the user's operation of the shutter release switch, a process to capture a still image from the captured moving image and record the still image by the recorder 119 is performed. Moreover, the camera operation unit 121 includes a reproduction mode selection switch. In response to selection of a reproduction mode by a user's operation of the reproduction mode selection switch, the camera controller 124 stops the image stabilization control.

Figure 2:
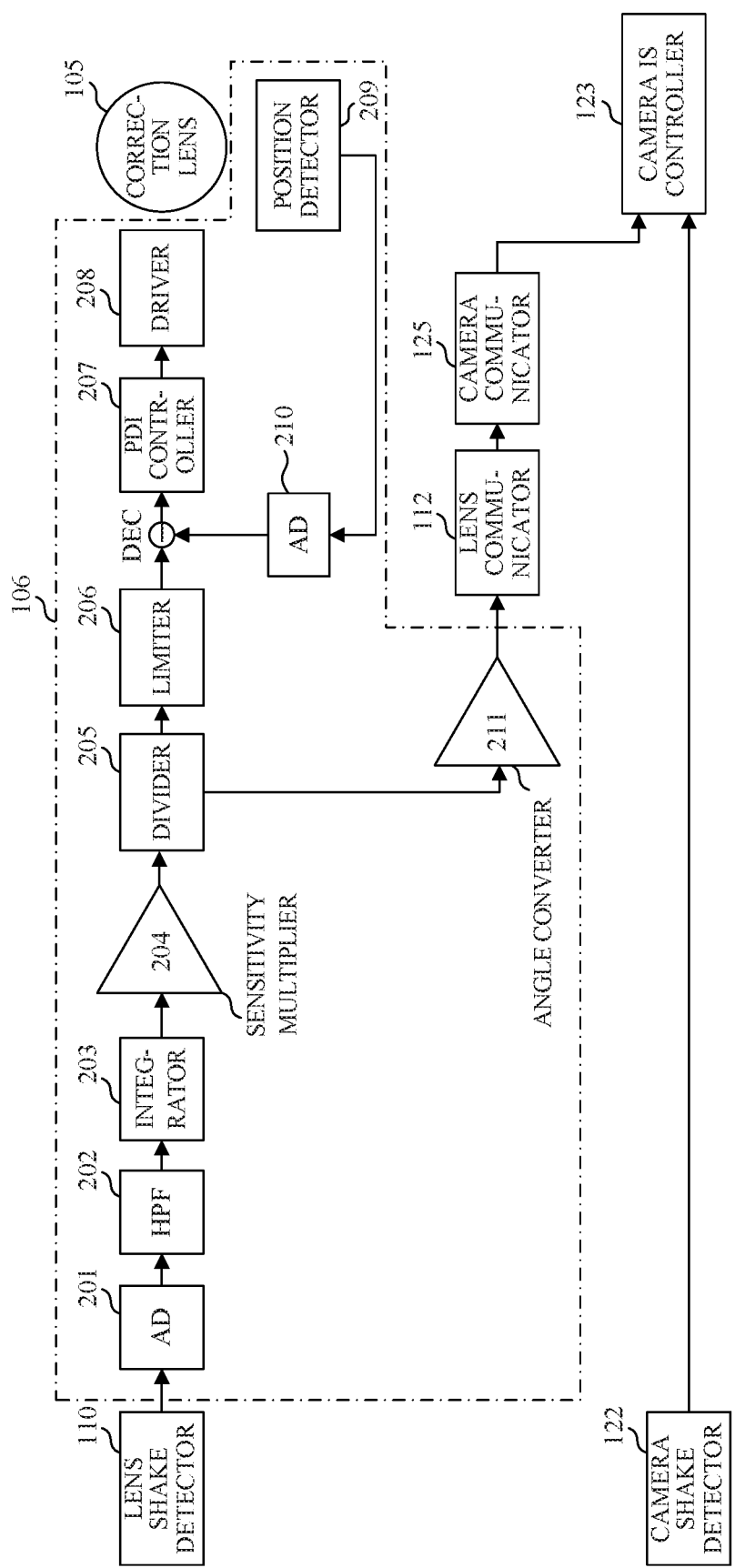
FIG. 2 is a block diagram of a configuration of an image stabilization part of the image-capturing system.
Figure 15:
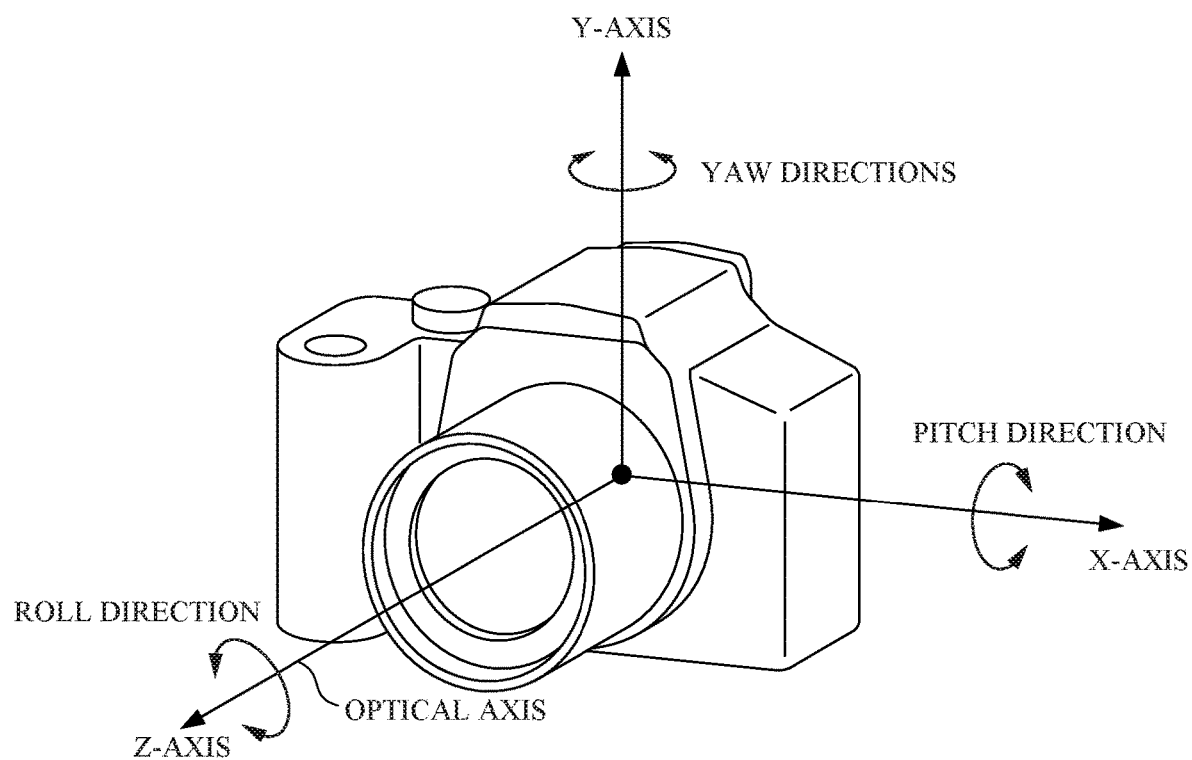
FIG. 15 illustrates a pitch direction, a yaw direction and a roll direction of the camera body.

Next, with reference to FIGS. 2 and 15, description will be made of the image stabilization control in the camera system of this embodiment. FIG. 2 illustrates a configuration relating to the image stabilization control in the camera system (the lens shake detector 110, the lens image stabilization controller 106, the camera shake detector 122 and the camera image stabilization controller 123). FIG. 15 illustrates a pitch direction, a yaw direction and a roll direction in the camera system.

In FIG. 2, the lens shake detector 110 and the camera shake detector 122 each include a gyro sensor as a shake sensor and each detect the angular velocity to output the (lens or camera) shake signal having a voltage corresponding to the detected angular velocity. The lens shake detector 110 includes a pitch shake detector and a yaw shake detector, which are not illustrated. The camera shake detector 122 includes a pitch shake detector, a yaw shake detector and a roll shake detector, which are not illustrated.

As illustrated in FIG. 15, the following description defines, in the camera system, the optical axis of the image-capturing optical system as a Z-axis, a vertical direction at a normal position of the camera system as a Y-axis, and a direction orthogonal to the Z- and Y-axes as an X-axis. The pitch direction corresponds to a rotation direction (tilt direction) about the X-axis, and the yaw direction corresponds to a rotation direction (pan direction) about the Y-axis. The roll direction corresponds to a rotation direction about the Z-axis, that is, a direction in which an image-capturing surface of the image sensor rotates in a plane orthogonal to the optical axis. In other words, the pitch direction is a direction in which the camera system vertically tilts relative to a horizontal plane, and the yaw direction is a direction in which the camera system horizontally pans relative to a certain vertical plane; the pitch and yaw directions are orthogonal to each other.

As illustrated in FIG. 2, a pitch shake signal from the pitch shake sensor in the lens shake detector 110, which indicates a shake in the pitch direction, and a yaw shake signal from the yaw shake sensor therein, which indicates a shake in the yaw direction are each input as lens shake signal to an AD converter 201. On the other hand, a pitch shake signal from the pitch shake sensor in the camera shake detector 122, which indicates a shake in the pitch direction, and a yaw shake signal from the yaw shake sensor therein, which indicates a shake in the yaw direction are each input as the camera shake signal to the camera image stabilization controller 123.

The AD converter 201 converts the lens shake signal from the lens shake detector 110 into angular velocity data as a digital signal. A high-pass filter 202 removes an offset component and a temperature drift component from the angular velocity data. The angular velocity data from the high-pass filter 202 is input to an integrator 203. The integrator 203 integrates the angular velocity data mainly by quasi-integration using a low-pass filter to produce angular displacement data. A sensitivity multiplier 204 converts, using an image stabilization sensitivity, the angular displacement data acquired from the integrator 203 into a total image stabilization correction amount. The image stabilization sensitivity changes depending on a focal length of the image-capturing optical system. Furthermore, the image stabilization sensitivity is corrected using a correction amount acquired by a sensitivity adjustment of the gyro sensor, and thereby a sensitivity variation of the gyro sensor is absorbed.

A divider 205 divides the total image stabilization correction amount output from the sensitivity multiplier 204 into an optical image stabilization correction amount that is a correction amount used in the optical image stabilization and an electronic image stabilization correction amount that is a correction amount used in the electronic image stabilization. Specifically, the divider 205 multiplies the total image stabilization correction amount by a coefficient K to calculate the optical image stabilization correction amount.

The coefficient K is set using following expression (1) where A represents an optical image stabilization possible range (that is, a maximum shiftable range of the correction lens 105) at each focal length of the image-capturing optical system, and B represents an electronic image stabilization possible range (that is, a maximum shiftable range of the video clip area).

$$K=A/(A+B) \tag{1}$$

As understood from expression (1), the coefficient K is 1 or less. Therefore, multiplying the total image stabilization correction amount by the coefficient K calculates the optical image stabilization correction amount (first correction amount) that is part of the total image stabilization correction amount.

A limiter 206 limits (clamps) the optical image stabilization correction amount within a shiftable range of the correction lens 105. This limitation prevents the correction lens 105 from staying at an end of its shiftable range. The limiter 206 outputs the optical image stabilization correction amount to a subtractor DEC. The subtractor DEC outputs a subtracted result to a PID controller 207. The PID controller 207 performs position control of the correction lens 105 depending on the subtracted result from the subtractor DEC.

The PID controller 207 performs the position control using a combination of P (proportional) control, I (integral) control and D (derivative) control. A driver 208 supplies an electric current for driving the correction lens 105, whose current value is controlled by a control signal output from the PID controller 207 and corresponds to the optical image stabilization correction amount, to an image-stabilizing actuator such as a voice coil motor (not illustrated) provided in the driver 208.

A position detector 209 detects a position of the correction lens 105 to output a position detection signal whose voltage depends on the detected position. An AD converter 210 converts the position detection signal as an analog signal from the position detector 209 into position detection data as a digital signal to output the position detection data to the subtractor DEC. The subtractor DEC calculates a difference (deviation) of the outputs from the limiter 206 and the AD converter 210 to output a result of the calculation to the PID controller 207. This enables feedback position control of the correction lens 105.

On the other hand, in order to calculate the electronic image stabilization correction amount to be given from the lens unit L to the camera body C, the divider 205 multiplies the total image stabilization correction amount output from the sensitivity multiplier 204 by a coefficient (1−K). The optical image stabilization correction amount is calculated by multiplying the total image stabilization correction amount by the coefficient K as described above. On the other hand, the electronic image stabilization correction amount is calculated by multiplying the total image stabilization correction amount by the coefficient (1−K). An angle converter 211 converts the electronic image stabilization correction amount (second correction amount) into angular displacement data. This conversion uses a conversion coefficient different depending on the focal length of the image-capturing optical system. That is, the conversion coefficient is changed depending on the focal length. The angular displacement data acquired by the conversion is transmitted as a lens electronic image stabilization correction amount (image stabilization information) to the camera image stabilization controller 123 in the camera body C though the lens and camera communicators 112 and 125.

The camera image stabilization controller 123 calculates a camera electronic image stabilization correction amount by using the camera shake signal from the camera shake detector 122, and calculates a combined value (that is, the final electronic image stabilization correction amount) of the received lens electronic image stabilization correction amount and the camera electronic image stabilization correction amount. The camera image stabilization controller 123 performs the electronic image stabilization depending on the combined value.

Figure 13:
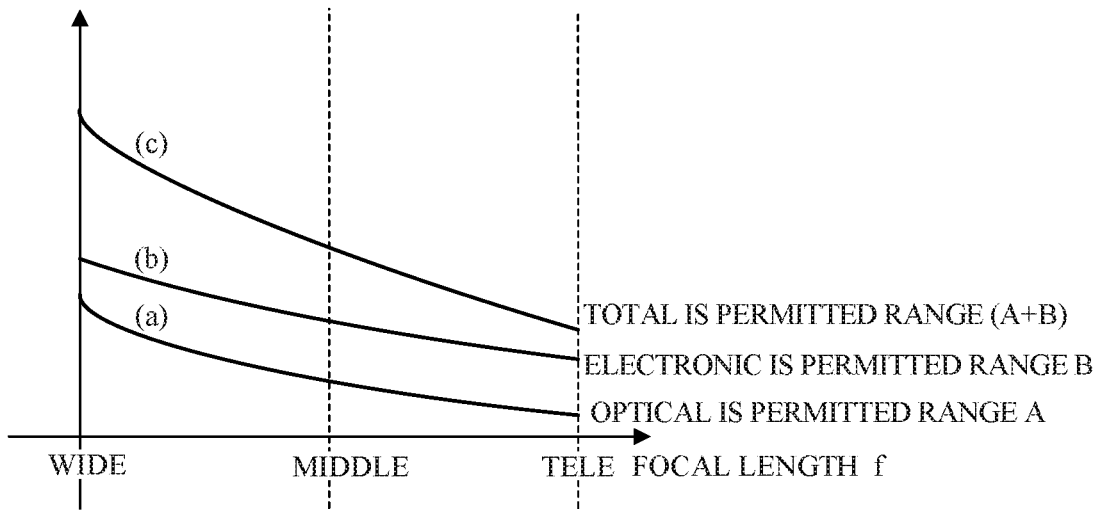
FIG. 13 is a graph illustrating a relation between focal lengths and image stabilization possible ranges.

FIG. 13 illustrates a relation between the focal length of the image-capturing optical system and the above-described optical and electronic image stabilization possible ranges. In FIG. 13, a horizontal axis indicates the focal length (zoom position) f; "Wide" indicates a wide-angle end, "Middle" indicates a middle zoom position, and "Tele" indicates a telephoto end. A vertical axis indicates each image stabilization possible range. A curved line (a) indicates the optical image stabilization possible range A, and a curved line (b) indicates the electronic image stabilization possible range B.

The optical image stabilization possible range A is set depending on optical characteristics of the image-capturing optical system (such as the focal length, a resolution and a peripheral light amount). The electronic image stabilization possible range B is set depending on a remaining video area outside the video clip area in the entire video signal. The optical image stabilization possible range A and the electronic image stabilization possible range B both change with the zoom position. Specifically, even when the lens or camera shake has the same magnification, a shift amount of the correction lens 105 to be driven for the optical image stabilization (that is, the optical image stabilization possible range A) is smaller at the wide-angle end of the image-capturing optical system than at the telephoto end, so that the electronic image stabilization possible range B changes with the optical image stabilization possible range A. The optical image stabilization possible range A and the electronic image stabilization possible range B are both managed in the image stabilization control as data on angular displacement amounts.

The correction lens 105 is shifted in the optical image stabilization possible range A illustrated in FIG. 13, and thereby the optical image stabilization is performed. The video clip area is shifted in the electronic image stabilization possible range B illustrated in the same figure, and thereby the electronic image stabilization is performed. A combination of these optical image stabilization and electronic image stabilization forms a total image stabilization possible range (A+B) illustrated by a curved line (c). FIG. 13 illustrates an example that, at the wide-angle end, the middle zoom position and the telephoto end, the optical image stabilization possible range A is 2, 0.75 and 0.3 degree, respectively, and the electronic image stabilization possible range B is 2.5, 1.6 and 1.1 degree, respectively.

Figure 14:
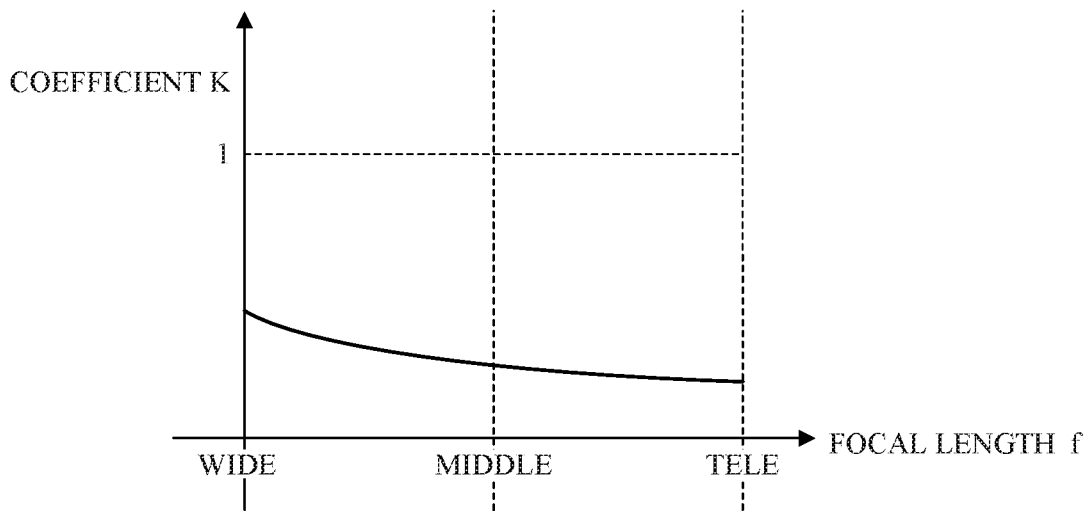
FIG. 14 is a graph illustrating a relation between the focal lengths and division coefficients.

FIG. 14 illustrates a relation between the focal length f and the coefficient K. A horizontal axis indicates the focal length f, and a vertical axis indicates the coefficient K. The coefficient K is set depending on the optical image stabilization possible range A and the electronic image stabilization possible range B. Values of the coefficient K in the example in FIG. 13 at the wide-angle end, the middle zoom position and the telephoto end are 0.444, 0.319 and 0.214, respectively.

In the second image stabilization mode in which the optical image stabilization and the electronic image stabilization are performed, the correction lens 105 is driven (shifted) using the optical image stabilization correction amount calculated using the coefficient K=A/(A+B) by the divider 205, and the video clip area 105 is shifted using the lens electronic image stabilization correction amount calculated using the coefficient (1−K). Performing both the optical image stabilization and the electronic image stabilization eliminates a boundary between the optical image stabilization possible range A and the electronic image stabilization possible range B. This results in reduction of turbulence of the video due to an overshoot of the optical image stabilization.

On the other hand, in the first image stabilization mode in which only the optical image stabilization is performed, the divider 205 sets the coefficient K for the optical image stabilization to 1 and sets the coefficient (1−K) for the electronic image stabilization to 0. Thereby, the collection lens 105 is driven by the optical image stabilization correction amount as the total image stabilization correction amount.

Next, description will be made of still image capturing in the second image stabilization mode. Turn-on of the SW2 by a user's operation of the shutter release switch in the camera operation unit 121 starts an exposure operation for still image capturing. In the exposure operation, the divider 205 sets the coefficient K for the optical image stabilization to 1, and sets the coefficient K for the electronic image stabilization to 0. As a result, the optical image stabilization is performed in which the optical image stabilization correction amount is the total image stabilization correction amount. After ending the exposure operation, the divider 205 sets the coefficient K for the optical image stabilization to A/(A+B), and sets the coefficient (1−K) for the electronic image stabilization. At the start and end of the exposure operation, in order to prevent a steep change of the optical image stabilization correction amount caused by stop and restart of the electronic image stabilization, a process is performed that gradually changes the optical image stabilization correction amount and the lens electronic image stabilization correction amount over time.

Figure 3:
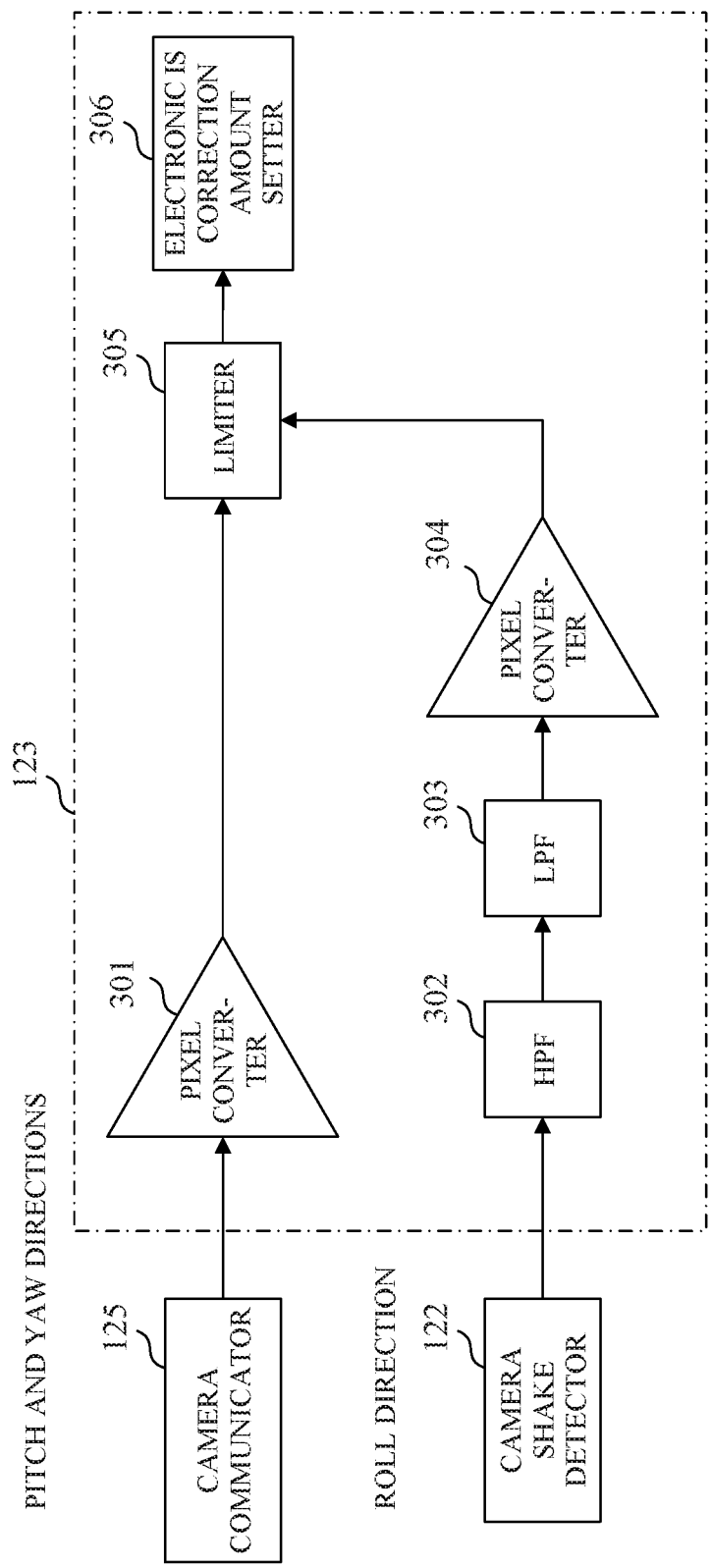
FIG. 3 illustrates a configuration of a camera image stabilization controller in the camera body.

FIG. 3 illustrates a configuration of the camera image stabilization controller 123. In FIG. 3, the camera controller 124 actually disposed between the camera shake detector 122, the camera communicator 125 and the camera image stabilization controller 123 is omitted. The camera communicator 125 receives, from the lens controller 111 through the lens communicator 112, pitch and yaw direction correction amounts (angular displacement amount equivalent values) as the lens electronic image stabilization correction amounts. A pixel converter 301 converts each of the lens electronic image stabilization correction amounts into a correction amount equivalent to a pixel number (the correction amount is hereinafter referred to as "a pixel number equivalent correction amount"), and outputs the pixel number equivalent correction amounts to a limiter 305. A conversion coefficient used for converting the lens electronic image stabilization correction amount to the pixel number equivalent correction amount depends on the focal length of the image-capturing optical system, and is changed with the focal length.

The camera shake detector 122 outputs a roll shake signal from the roll shake sensor to a high-pass filter 302. The high-pass filter 302 removes an offset component and a temperature drift component from the roll shake signal. Furthermore, a low-pass filter 303 reduces a high-frequency noise of the roll shake signal to output the roll shake signal after the noise reduction to a pixel converter 304. The pixel converter 304 converts, as well as the pixel converter 301, the roll shake signal into a pixel number equivalent correction amount, and outputs the pixel number equivalent correction amount to a limiter 305.

The limiter 305 limits (clamps) the pixel number equivalent correction amounts from the two pixel converters 301 and 304 within a pixel number corresponding to the electronic image stabilization possible range B. That is, limit levels are respectively set for three correction axis directions that are the pitch, yaw and roll directions. A correction amount exceeding the limit level is input to an electronic image stabilization correction amount setter 306. The electronic image stabilization correction amount setter 306 sets the electronic image stabilization correction amount for each correction axis direction.

Figure 4:
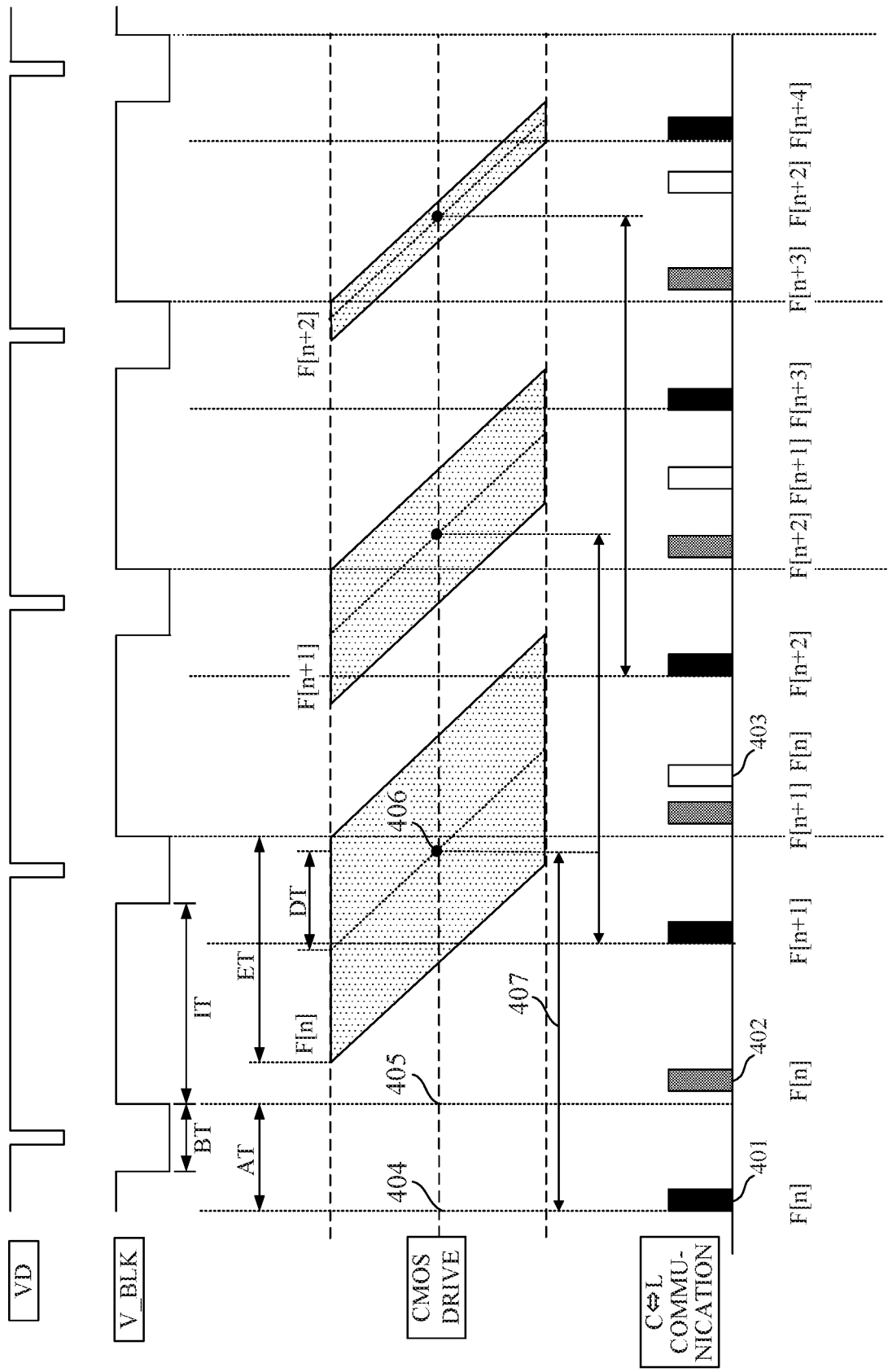
FIG. 4 is a time chart of communications performed between the camera body and the lens unit.

FIG. 4 is a time chart of communications performed between the camera and lens controller 124 and 111. In order to perform the optical image stabilization and the electronic image stabilization, the camera controller 124 has to provide to the lens controller 111 an exposure centroid time 406 that is a time corresponding to a centroid of an exposure amount (in other words, an exposure centroid) in the image capturer 115. However, the camera and lens controllers 124 and 111 perform various communications relating not only to the image stabilization, but also to AF (autofocus), AE (auto exposure) and others. If a communication time of the exposure centroid time 406 fluctuates due to overlap with other communications and thereby the exposure centroid time 406 cannot be accurately provided to the lens controller 111, an insufficient image stabilization control may be performed. Thus, in this embodiment the camera controller 124 performs, in order to prevent a time lag (communication time lag) of the communication for providing the exposure centroid time 406 to the lens controller 111, two communication processes for separately providing a reference time and a relative time period.

Furthermore, a large amount of information communicated between the camera and lens controllers 124 and 111 makes it difficult to complete the image stabilization within a predetermined time. Moreover, in order to use various lens units, it is necessary to be capable of performing the image stabilization regardless of their specifications. Thus, in this embodiment the lens unit L (that is, the lens controller 111) performs the optical image stabilization in the lens unit L, and provides to the camera body C information (that is, the lens electronic image stabilization correction amount) used in the electronic image stabilization performed in the camera body C.

In FIG. 4, VD represents a time of a vertical synchronization signal, and V_BLK represents a time of start of a vertical blanking time period. Furthermore, "CMOS drive" represents a drive state of the image sensor, and the communications between the camera body C and the lens unit L are illustrated at the lowest part of FIG. 4. FIG. 4 illustrates a time 404 of a first communication 401 (this time is hereinafter referred to as "a first communication time"), a time 405 at which the exposure time period is set (this time is hereinafter referred to as "an exposure time period setting time"), and an exposure centroid time 406. In addition, F[n] represents an n-th frame as an image-capturing frame (hereinafter simply referred to as "a frame"). Time periods illustrated in FIG. 4 are as follows.

BT: the vertical blanking time period
IT: an image time period
AT: a time period from the first communication time 404 to the exposure time period setting time 405.
ET: an exposure time period
DT: a delay time from a center of the exposure time period ET to the exposure centroid time 406

The exposure centroid time 406 from the exposure time period setting time 405 is calculated as follows using the center of the exposure time period ET.

$$IT+BT-ET/2+DT$$

A parallelogram illustrated at each frame indicates the exposure amount. As an area of the parallelogram decreases, the exposure amount decreases. A time at a centroid of the parallelogram corresponds to the exposure centroid time 406. At a time point (a right-upper apex of the parallelogram) at which the exposure time period ET elapses from a time point (a left-upper apex of the parallelogram) at which the exposure is started, signal read-out from the image sensor is started.

In response to the vertical synchronous signal (VD) of the image capturer 115, the camera controller 124 performs, at the first communication time 404, the first communication 401 to the lens controller 111. The first communication 401 transmits a time as a reference (reference time) for causing the lens controller 111 to acquire the exposure centroid time 406. That is, the lens controller 111 acquires, at the time of receiving the first communication 401, a time (timer time) counted by its internal timer as the reference time for calculating the exposure centroid time 406. The first communication time 404 at which the first communication 401 is performed may be a time identical to the vertical synchronization signal, or may be shifted before or after the vertical synchronization signal. However, in the latter case, the first communication 401 is performed at each frame with a fixed time difference relative to the vertical synchronization signal.

In addition, the first communication time 404 is set such that the first communication 401 does not overlap other communications. In FIG. 4, the first communication time 404 is set to a time before (previous to) the vertical synchronization signal.

Next, the camera controller 124 performs a second communication 402 to the lens controller 111. The second communication 402 transmits, to the lens controller 111, information on a relative time period 407 from the first communication time 404 and information on the electronic image stabilization possible range B at a current focal length. The second communication 402 is performed at a time (hereinafter referred to as "a second communication time") after a time 405 at which the exposure time period in a frame in which the exposure centroid time 406 is transmitted from the camera controller 124 to the lens controller 111 is set. Thereby, in a case where the exposure time period is changed in each frame, the lens controller 111 can accurately acquire the exposure centroid time 406.

The exposure centroid time 406 is calculated using the set exposure time period and a time period (signal read-out time period) required to the signal read-out from the image sensor, and then the relative time period 407 from the first communication time 404 as the reference time is calculated. That is, the relative time period 407 is calculated by:

$$AT+IT+BT-ET/2+DT.$$

The exposure time period setting time 405 in each frame is not fixed.

The lens controller 111 receives information on the relative time period 407 from the camera controller 124 through the second communication 402. Thereby, the lens controller 111 can acquire, using the internal timer, the exposure centroid time 406 corresponding to a time after the relative time period 407 has elapsed from the reference time received through the first communication 401.

Furthermore, the lens controller 111 receives information on the electronic image stabilization possible range B through the second communication 402, and calculates, using the information, the optical image stabilization possible range A in the lens unit 111 and the coefficient K used in the divider 205. The lens controller 111 acquires, at the exposure centroid time 406, the lens shake signal from the lens shake detector 110. The divider 205 divides the total image stabilization correction amount into the optical image stabilization correction amount and the lens electronic image stabilization correction amount. The lens controller 111 holds the lens electronic image stabilization correction amount divided from the total image stabilization correction amount in its internal memory until receiving a communication request from the camera controller 124.

Thereafter, the camera controller 124 performs a third communication 403 to the lens controller 111. In the third communication 403, the lens controller 111 having received the communication request from the camera controller 124 transmits the lens electronic image stabilization correction amount having been divided from the total image stabilization correction amount and held in the internal memory to the camera controller 124. The third communication 403 is performed at a time (third communication time) after the exposure centroid time 406. At the third communication time, since the camera controller 124 has already acquired the exposure centroid time 406, the third communication 403 is performed at an arbitrary time after the exposure centroid time 406.

The camera controller 124 sends the lens electronic image stabilization correction amount received from the lens controller 111 to the camera image stabilization controller 123. The electronic image stabilization correction amount setter 306 in the camera image stabilization controller 123 sets the final electronic image stabilization correction amount by using the pixel number equivalent correction amounts acquired from the lens electronic image stabilization correction amounts (for the pitch and yaw directions) and the camera image stabilization correction amount (for the roll direction).

The camera controller 124 performs the first to third communications 401 to 403 in each frame. As described above, the camera controller 124 transmits through the first communication 401 the reference time to the lens controller 111, and transmits though the second communication 402 the relative time period 407 from the reference time and the electronic image stabilization possible range B. Then, the camera controller 124 acquires through the third communication 403 the lens electronic image stabilization correction amount from the lens controller 111.

On the other hand, the lens controller 111 acquires through the first communication 401 the reference time, and receives through the second communication 402 the relative time period 407 from the reference time to acquire the exposure centroid time 406. The lens controller 111 further acquires through the second communication 402 the electronic image stabilization possible range B. Then, the lens controller 111 transmits the lens electronic image stabilization correction amount divided from the total image stabilization correction amount acquired at the exposure centroid time 406 to the camera controller 124 through the third communication 403.

FIG. 5 illustrates a flowchart of a communication process (and an image stabilization process) performed by the camera controller 124. FIG. 6 illustrates a flowchart of a communication process performed by the lens controller 111. The camera controller 124 and the lens controller 111 each constituted as a computer including a CPU execute these processes according to communication process programs as computer programs.

At step S101 in FIG. 5, the camera controller 124 performs the first communication 401 to the lens controller 111 at the first communication time 404 to cause the lens controller 111 to acquire the reference time for acquiring the exposure centroid time 406.

Next, at step S102, the camera controller 124 performs the second communication 402 to transmit the relative time period 407 from the reference time to the lens controller 111. Thereby, the camera controller 124 acquires itself the exposure centroid time 406, and causes the lens controller 111 to acquire the exposure centroid time 406. Furthermore, at step S102, the camera controller 124 transmits, to the lens controller 111 through the second communication 402, the electronic image stabilization possible range B at a current focal length.

Next, at step S103, the camera controller 124 determines whether or not a predetermined time period has elapsed from the exposure centroid time 406. If the predetermined time period has elapsed from the exposure centroid time 406, the camera controller 124 proceeds to step S104, and otherwise repeats the determination at step S103.

The reason for waiting for the elapse of the predetermined time period at step S103 is that the camera controller 124 transmits a transmission request to the lens controller 111 for requesting the lens controller 111 to transmit the lens electronic image stabilization correction amount after the lens controller 111 completes acquiring the lens electronic image stabilization correction amount from the total image stabilization correction amount acquired at the exposure centroid time 406.

At step S104, the camera controller 124 performs the third communication 403 to the lens controller 111 to acquire the lens electronic image stabilization correction amount acquired at the exposure centroid time 406.

Next, at step S105, the camera controller 124 sets the final electronic image stabilization correction amount by using the lens electronic image stabilization correction amount acquired at step S104 and the camera electronic image stabilization correction amount. Then, the camera controller 124 causes the camera image stabilization controller 123 to perform the electronic image stabilization using the final electronic image stabilization correction amount.

On the other hand, at step S201 in FIG. 6, the lens controller 111 receives the first communication 401 from the camera controller 124 to acquire a timer time at the first communication time 404 as the reference time for acquiring the exposure centroid time 406.

Next at step S202, the lens controller 111 receives the second communication 402 from the camera controller 124 to acquire the relative time period 407 from the reference time. The lens controller 111 causes the lens image stabilization controller 106 to acquire the exposure centroid time 406 using the reference time and the relative time period 407. The lens controller 111 further acquires the electronic image stabilization possible range B through the second communication 402. Then, the lens controller 111 causes the lens image stabilization controller 106 to calculate the coefficient K used by the divider 205 from this electronic image stabilization possible range B and the optical image stabilization possible range A in the lens unit L, and to calculate, using the coefficient K, the optical image stabilization correction amount and the lens electronic image stabilization correction amount.

Next at step S203, the lens controller 111 determines whether or not the timer time has reached the exposure centroid time 406. If the timer time has reached the exposure centroid time 406, the lens controller 111 proceeds to step S204, and otherwise repeats the determination at step S203.

At step 204, the lens controller 111 acquires, at the exposure centroid time 406, the lens shake signal from the lens shake detector 110. Then, the lens controller 111 causes the lens image stabilization controller 106 to calculate the total image stabilization correction amount from the lens shake signal, and to divide, using the coefficient K, the total image stabilization correction amount into the optical image stabilization correction amount and the lens electronic image stabilization correction amount. The lens controller 111 temporarily stores the lens electronic image stabilization correction amount in its internal memory until receiving the transmission request from the camera controller 124.

Next at step S205, the lens controller 111 determines whether or not having received the communication request for the third communication 403 from the camera controller 124. If having received the communication request for the third communication 403, the lens controller 111 proceeds to step S206, and otherwise repeats the determination at step S205.

At step S206, the lens controller 111 receives the third communication 403, and in response thereto, transmits the lens electronic image stabilization correction amount temporarily stored in its internal memory at step S204 to the camera controller 124.

Description will hereinafter be made of examples, as first to third embodiments, of a communication reset process performed by the lens and camera controllers 111 and 124 when a communication error occurs between the lens unit L (that is, the lens controller 111) and the camera body C (that is, the camera controller 124) in the above-described camera system.

Embodiment 1

When a communication error, such as the communication time lag, that requires the communication reset process has occurred between the lens unit L (lens controller 111) and the camera body C (camera controller 124), it is necessary to quickly return from a communication error state in which the communication error has occurred to a normal communication-enabled state in which normal communication can be performed. Therefore, in the first embodiment (Embodiment 1) of the present invention, the lens controller 111 performs, in response to detecting the communication error, the communication reset process as a communication restoration process for restoring the normal communication without waiting for a response from the camera controller 124.

Figure 7:
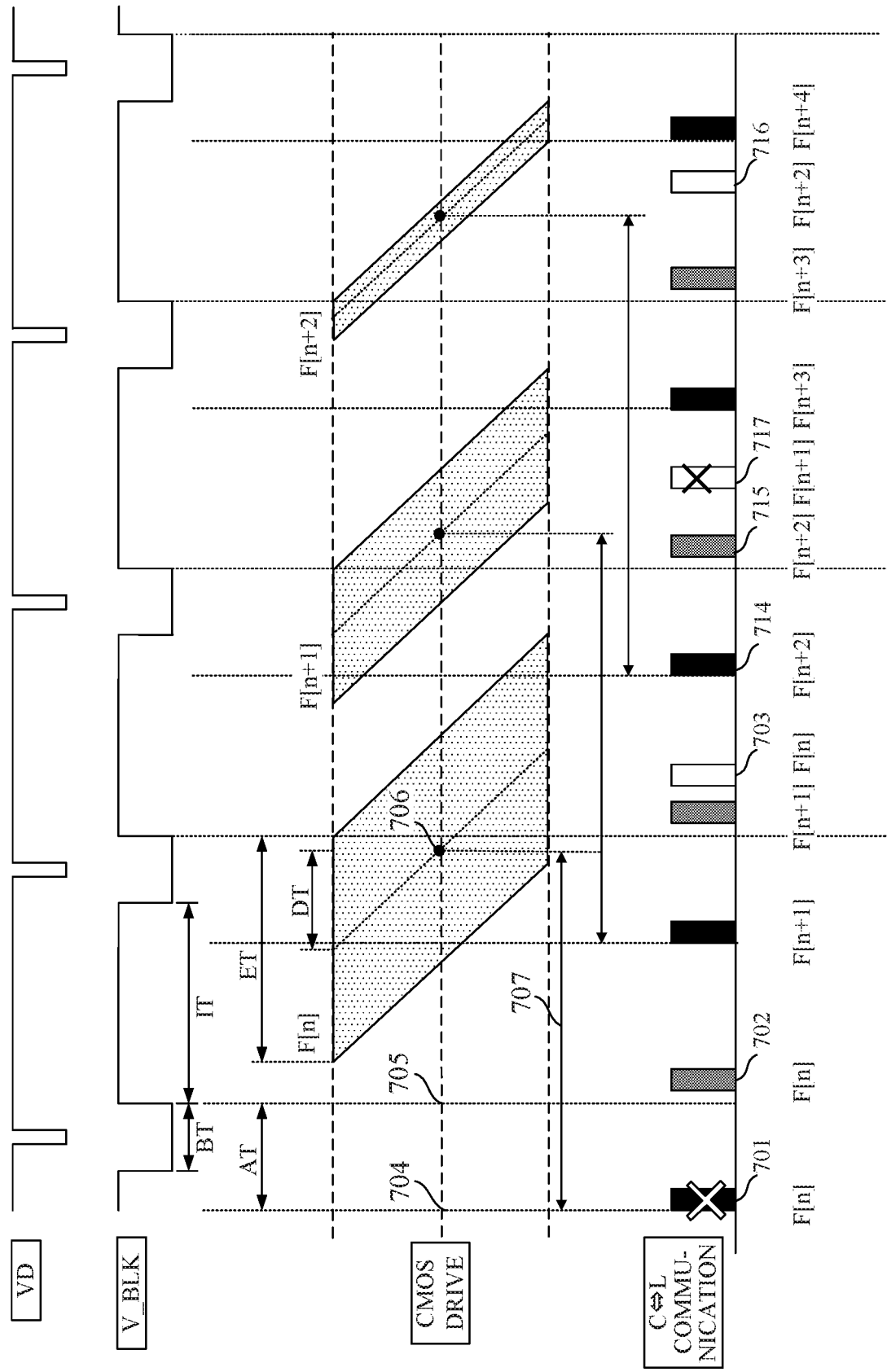
FIG. 7 is a time chart of communications performed between the camera body and the lens unit in Embodiment 1.

With reference to FIG. 7, description will be made of the communication reset process (using a communication control method) performed by the lens controller 111 when the communication error occurs. In FIG. 7, communications and times denoted by reference numerals 702 to 706 are the same as those denoted by reference numerals 402 to 406 in FIG. 4, respectively.

FIG. 7 illustrates an example in which the camera controller 124 performs the second communication 702 to the lens controller 111 without performing the first communication 701. When receiving only the second communication 702, the lens controller 111 cannot calculate the exposure centroid time 706 since it does not receive the first communication 701 as a reference, and therefore the lens controller 111 cannot acquire the lens electronic image stabilization correction amount at the exposure centroid time 706. Furthermore, though not illustrated in FIG. 7, in a case where a sequential order of the communication is not normal, for example, in a case where the first communication 701 or the second communication 702 is not performed, a communication error state in which the communication time lag continues afterward occurs, which makes it necessary to perform the communication reset process.

In such a case, the lens controller 111 transmits, in response to receiving the third communication 703, as a response thereto, a notice indicating that the communication error requiring the communication reset process has occurred (the notice is hereinafter referred to as "a reset-requiring error notice") to the camera controller 124. The lens controller 111 further performs the communication reset process without waiting for a response from the camera controller 124 receiving the reset-requiring error notice. The communication reset process is a process to clear information that the lens controller 111 has already received from the camera controller 124 and stored in the lens controller 111 (such as information on a relative time period 707 received through the second communication 702).

On the other hand, the camera controller 124 having received the reset-requiring error notice performs again the series of communications including a first communication 714, a second communication 715 and a third communication 716 without transmitting any response to the lens controller 111. This process enables restoring the normal communication-enabled state from the communication error state. However, the camera controller 124 controls, immediately after receiving the reset-requiring error notice, the communication so as not to perform (that is, so as to stop) a third communication 717. The reason therefor is as follows. The lens controller 111 clears, after receiving the reset-requiring error notice, the information stored before receiving the notice. Therefore, information on a frame F(n+1) that is next to a frame F(n) in which the communication error requiring the communication reset process has occurred is cleared. The third communication 717 performed by the camera controller 124 in such a case causes abnormality in sequential order of the communication again, which is undesirable.

FIG. 8 is a flowchart illustrating a communication process (using the communication control method) performed by the lens controller 111. FIG. 9 is a flowchart illustrating a communication process performed by the camera controller 124. As described above, the lens controller 111 and the camera controller 124 execute these processes according to the communication process programs.

At step S301 in FIG. 8, the lens controller 111 receives the second communication 702 from the camera controller 124. However, the lens controller 111 does not know the reference time for acquiring the exposure centroid time 706 because not receiving the first communication 701 from the camera controller 124 prior to the second communication 702.

In such a case, the lens controller 111 detects at step S302 that the communication error requiring the communication reset process (the communication error is hereinafter referred to as "a reset-requiring communication error") has occurred, and then proceeds to step S303. At step S303, the lens controller 111 determines whether or not having received a communication request requesting the third communication 703 from the camera controller 124. If having received the communication request requesting the third communication 703, the lens controller 111 proceeds to step S304, and otherwise repeats the determination at step S303.

At step S304, the lens controller 111 receives the third communication 703 from the camera controller 124, and transmits the reset-requiring error notice to the camera controller 124.

Thereafter, at step S305, the lens controller 111 performs the communication reset process to clear the information such as the relative time period 707 having received from the camera controller 124 and stored until then, without waiting for receiving the response to the reset-requiring error notice from the camera controller 124. Then, the lens controller 111 again prepares so as to receive the first communication 714 from the camera controller 124 after the communication reset process.

On the other hand, at step 401 in FIG. 9, the camera controller 124 performs the second communication 702 to the lens controller 111 without performing the first communication 701 due to any error. Through this second communication 702, the camera controller 124 transmits the relative time period 707 from the reference time that has not been transmitted to the lens controller 111, and transmits the electronic image stabilization possible range B at a current focal length.

Next at step S402, the camera controller 124 determines whether or not a predetermined time period has elapsed from the exposure centroid time 706 calculated from the reference time that the camera controller 124 has already acquired and the relative time period 707. If the predetermined time period has elapsed from the exposure centroid time 706, the camera controller 124 proceeds to step S403, and otherwise repeats the determination at step S402. The reason for waiting for the elapse of the predetermined time at step S402 is the same as that described at step 103 in FIG. 5.

At step S403, the camera controller 124 performs the third communication 703 to the lens controller 111 to request the lens controller 111 to transmit the lens electronic image stabilization correction amount divided from the total image stabilization correction amount by the lens controller 111 at the exposure centroid time 706. However, since having not performed the first communication 701 to the lens controller 111, the camera controller 124 receives the reset-requiring error notice from the lens controller 111. The camera controller 124 receiving the reset-requiring error notice recognizes that the reset-requiring communication error has occurred in the lens unit L and that the lens controller 111 has performed the communication reset process. The camera controller 124 allows the lens controller 111 to perform the communication reset process without performing any response to the reset-requiring error notice from the lens controller 111.

At next step S404, the camera controller 124 controls the communication so as not to perform the third communication 717 immediately after receiving the reset-requiring error notice. This control enables preventing the above-described abnormality in sequential order of the communication from occurring again.

As described above, in this embodiment, the lens controller 111 having detected the reset-requiring communication error transmits the reset-requiring error notice indicating that the reset-requiring communication error has occurred to the camera controller 124. However, the lens controller 111 performs the communication reset process without waiting for the response from the camera controller 124 to the reset-requiring error notice. This enables quickly restoring the normal communication-enabled state from the communication error state, which enables minimizing a suspension time period of transmission and receipt of the information on the image stabilization (such as the relative time period and the image stabilization correction amount) during the image stabilization operation, that is, a suspension time period of the image stabilization operation.

Furthermore, the camera controller 124 also can recognize, in response to receiving the reset-requiring error notice from the lens controller 111, that the lens controller 111 has performed the communication reset process, so that the camera controller 124 can quickly perform processes required thereafter.

Embodiment 2

Although Embodiment 1 described the case where the lens controller 111 detects the reset-requiring communication error, there is a case where the lens controller 111 detects a communication error not requiring the communication reset process. In the second embodiment (Embodiment 2), the lens controller 111 performs, in such a case, only a communication error notice (hereinafter referred to as "a non-reset-requiring notice") to the camera controller 124.

Figure 10:
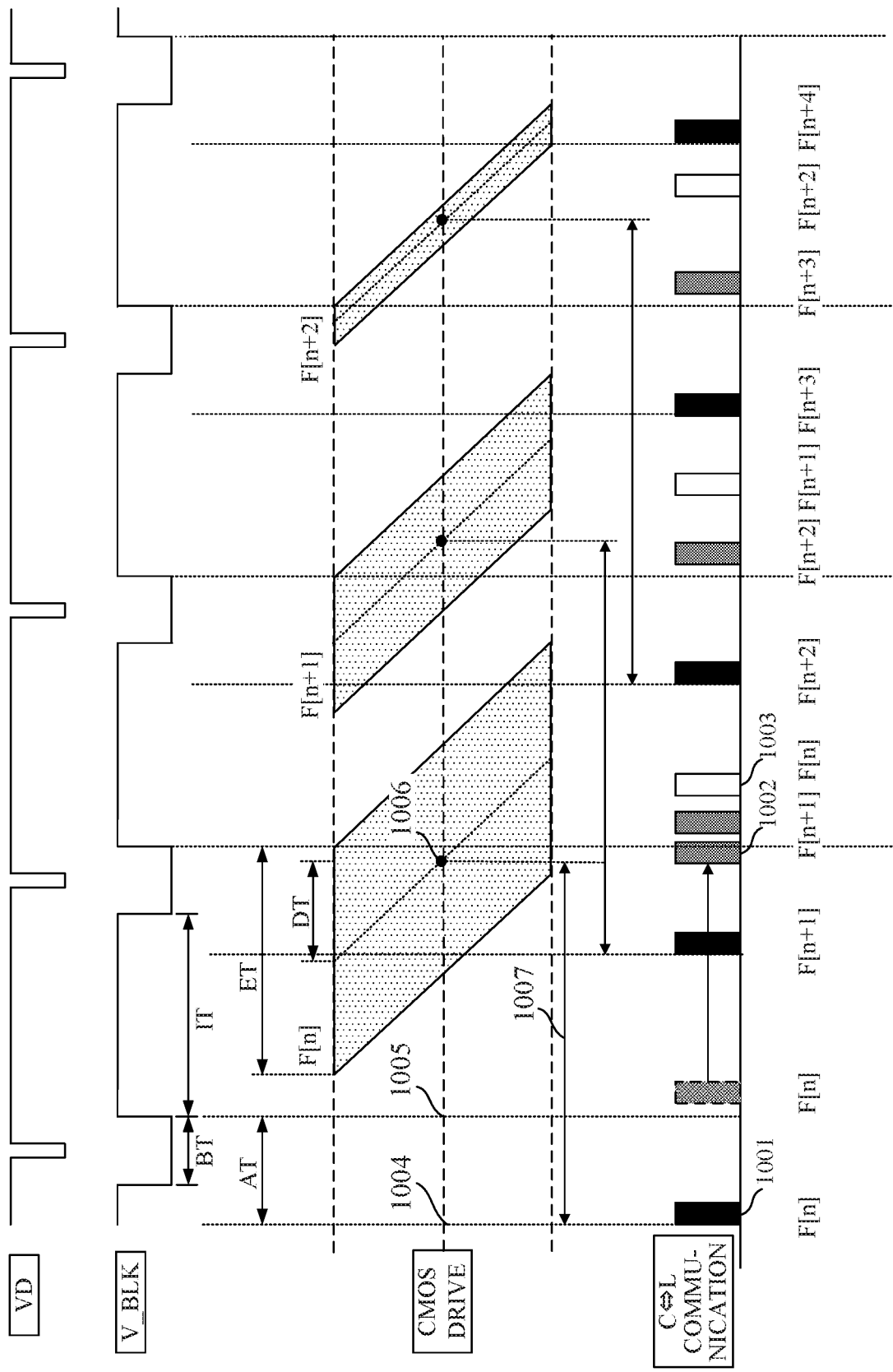
FIG. 10 is a time chart of communications performed between the camera body and the lens unit in Embodiment 2.

With reference to FIG. 10, description will be made of a communication process performed by the lens controller 111 when the communication error not requiring the communication reset process occurs. In FIG. 10, communications and times denoted by reference numerals 1001 and 1003 to 1006 are the same as those denoted by reference numerals 401 and 403 to 406 in FIG. 4, respectively.

This embodiment will describe an example in which a time at which the camera controller 124 performs a second communication 1002 is after the exposure centroid time 1006.

When receiving the second communication 1002 after the exposure centroid time 1006, the lens controller 111 cannot calculate the lens electronic image stabilization correction amount at the time of the receipt. However, the sequential order of the first communication 1001, the second communication 1002 and the third communication 1003 in this embodiment is normal, so that the receipt of the second communication 1002 is not a communication error in which the communication time lag continues thereafter, but a communication error ends once. Thus, this communication error does not require the communication reset process.

The lens controller 111 receiving the third communication 1003 after the second communication 1002 transmits, as a response thereto, the non-reset-requiring notice to the camera controller 124. At this time, the lens controller 111 does not perform the communication reset process, and therefore does not clear the information received from the camera controller 124 until then.

On the other hand, the camera controller 124 having received the non-reset-requiring error notice performs again the series of communications including the first communication 1001, the second communication 1002 and the third communication 1006, without transmitting any response to the lens controller 111. This enables restoring the normal communication-enabled state from the communication error state.

Figure 11:
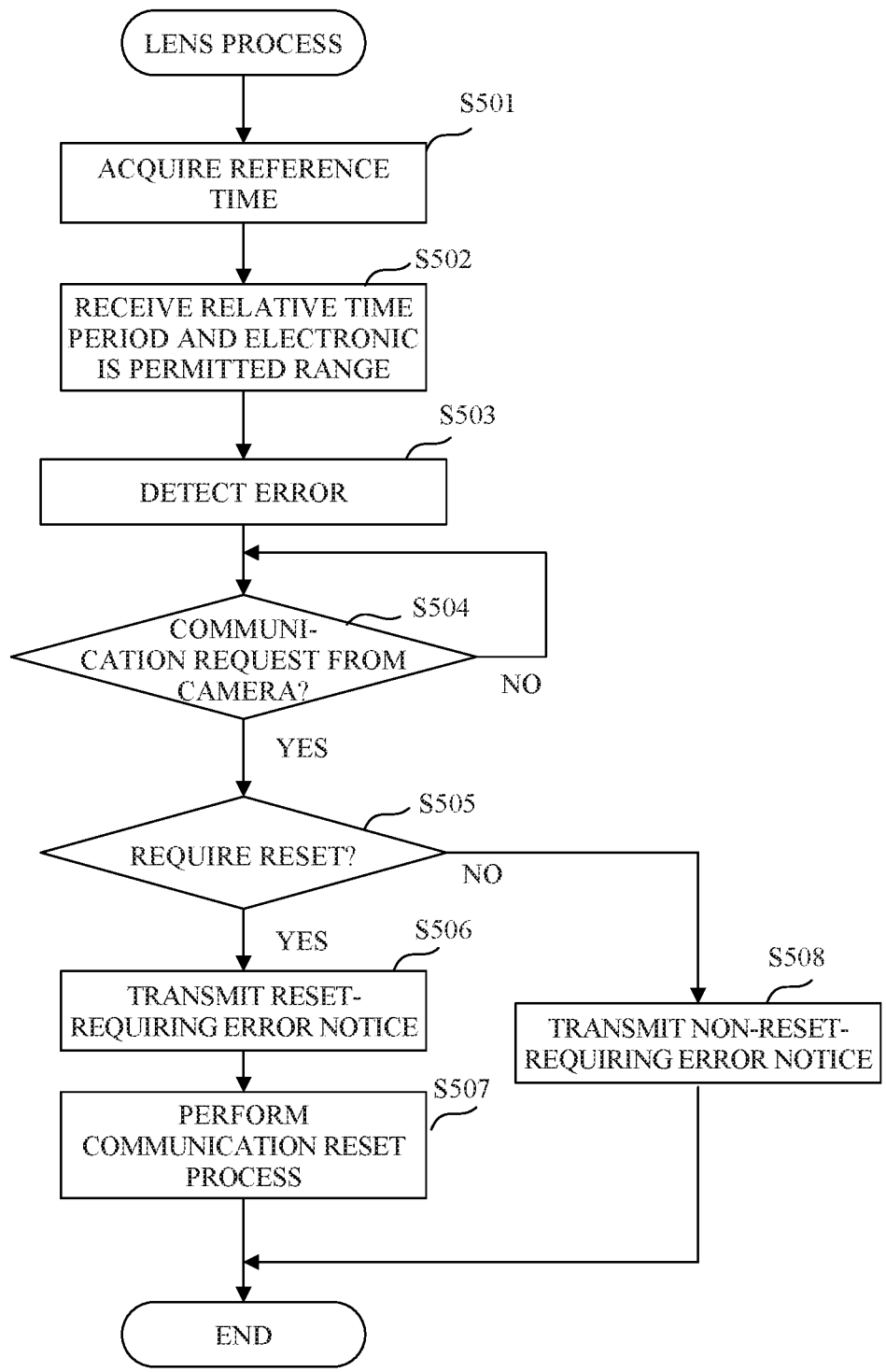
FIG. 11 is a flowchart of a communication process performed by the lens unit in Embodiment 2.
Figure 12:
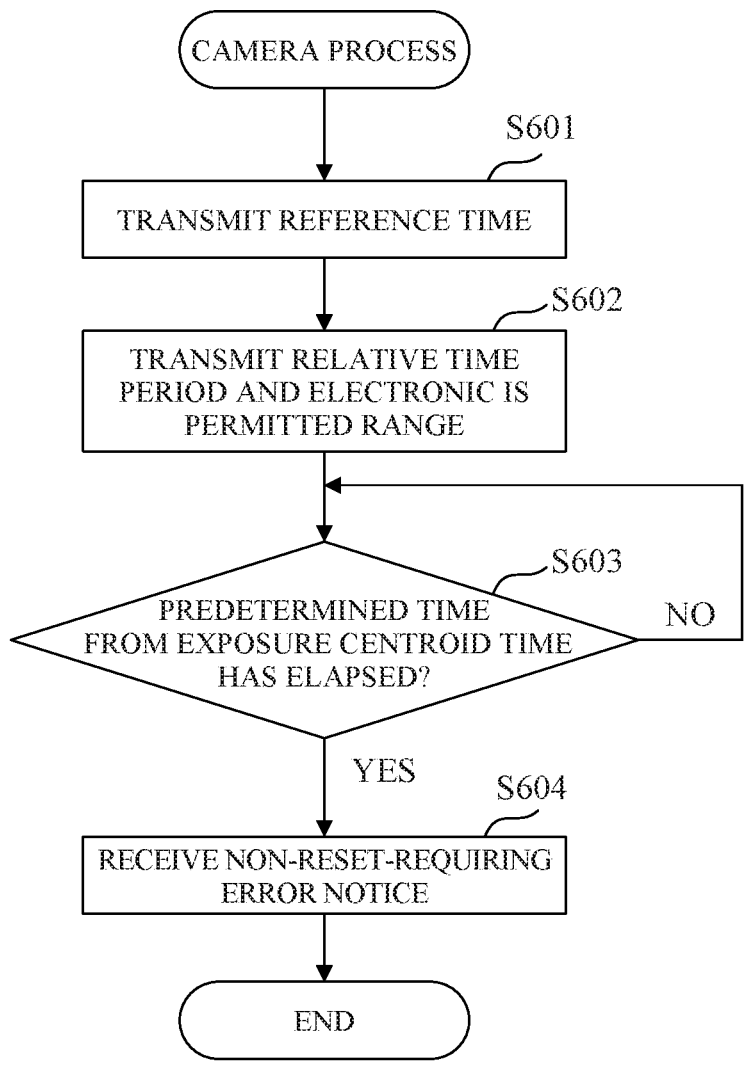
FIG. 12 is a flowchart of a communication process performed by the camera body in Embodiment 2.

FIG. 11 is a flowchart illustrating a communication process performed by the lens controller 111. FIG. 12 is a flowchart illustrating a communication process performed by the camera controller 124. As in Embodiment 1, the lens controller 111 and the camera controller 124 execute these processes according to communication process programs.

At step S501 in FIG. 11, the lens controller 111 receives the first communication 1001 from the camera controller 124 at the first communication time 1004 to acquire a reference time for acquiring the exposure centroid time 1006.

Next at step S502, the lens controller 111 acquires, through the second communication 1002 from the camera controller 124, a relative time period 1007 and the electronic image stabilization possible range B. However, as illustrated in FIG. 10, this time is after the exposure centroid time 1006 calculated from the reference time and the relative time period 1007. On the other hand, the sequential order of the first to third communications 1001 to 1003 is normal, so that this communication error does not require the communication reset process (the communication error is hereinafter referred to as "a non-reset-requiring communication error"). Therefore, at next step S503, the lens controller 111 detects the communication error and then proceeds to step S504.

At step S504, the lens controller 111 determines whether or not having received a communication request requesting the third communication 1003 from the camera controller 124. If having received the communication request requesting the third communication 1003, the lens controller 111 proceeds to step S505, and otherwise repeats the determination at step S503.

At step S505, the lens controller 111 determines whether or not the communication error detected at step S503 is the reset-requiring communication error described in Embodiment 1. If the detected communication error is the reset-requiring communication error, the lens controller 111 proceeds to step 506. If the detected communication error is the non-reset-requiring communication error, the lens controller 111 proceeds to step 507.

At step S506, the lens controller 111 receives the third communication 1003 from the camera controller 124, and in response to thereto transmits the reset-requiring error notice to the camera controller 124 as in Embodiment 1. Then, at step S507, the lens controller 111 performs the communication reset process without waiting for receiving any response to the reset-requiring error notice from the camera controller 124. Thereafter, the lens controller 111 prepares so as to receive a next first communication 1001 from the camera controller 124.

On the other hand, at step S508, the lens controller 111 receives the third communication 1003 from the camera controller 124, and in response to thereto transmits the non-reset-requiring notice to the camera controller 124. Then, the lens controller 111 prepares so as to receive a next first communication 1001 from the camera controller 124.

At step S601 in FIG. 12, the camera controller 124 performs the first communication 1001 to the lens controller 111 at the first communication time 1004, thereby causing the lens controller 111 to acquire the reference time for acquiring the exposure centroid time 1006.

Next at step S602, the camera controller 124 transmits, to the lens controller 111 through the second communication 1002, the relative time period 1007 and the electronic image stabilization possible range B at a current focal length. However, the following description will describe a case where the second communication 1002 from the camera controller 124 to the lens controller 111 is delayed due to any error. In response to receiving the relative time period 1007 through the second communication 1002, the lens controller 111 acquires the exposure centroid time 1006. However, the second communication 1002 is performed after the exposure centroid time 1006.

Therefore, the camera controller 124 determines at step S603 whether or not a predetermined time period has elapsed from the exposure centroid time 1006 that the camera controller 124 has calculated from the reference time acquired itself and the relative time period 1007. If the predetermined time period has elapsed from the exposure centroid time 1006, the camera controller 124 proceeds to step S604, and otherwise repeats the determination at step S603. The reason for waiting for the elapse of the predetermined time at step S603 is as described at step S103 in FIG. 5.

At step S604, the camera controller 124 performs the third communication 1003 to the lens controller 111 to request the lens controller 111 to transmit the lens electronic image stabilization correction amount divided from the total image stabilization correction amount by the lens controller 111 at the exposure centroid time 1006. However, since the second communication 1002 has been performed after the exposure centroid time 1006, the camera controller 124 receives the non-reset-requiring error notice from the lens controller 111.

The camera controller 124 receiving the non-reset-requiring error notice recognizes that the communication has occurred in the lens unit L. However, the received error notice is not the reset-requiring error notice, so that the camera controller 124 does not perform the communication reset process. In addition, the camera controller 124 does not transmit any response to the non-reset-requiring error notice to the lens controller 111.

As described above, in this embodiment the lens controller 111 having detected the non-reset-requiring communication error transmits the non-reset-requiring error notice indicating that the non-reset-requiring communication error has occurred to the camera controller 124. This enables preventing the communication reset process that is not required from being performed, and thereby enables quickly restoring the normal communication-enabled state from the communication error state.

Furthermore, the camera controller 124 also can quickly perform processes required thereafter in response to receiving the non-reset-requiring error notice from the lens controller 111.

Embodiment 3

The third embodiment (Embodiment 3) will describe a case where the camera controller 124 detects a communication error. For example, the camera controller 124 adds handle information to the second communication transmitted to the lens controller 111, and the lens controller 111 adds handle information to the response (that is, the lens electronic image stabilization correction amount) to the next third communication from the camera controller 124. This enables the camera controller 124 and the lens controller 111 to mutually confirm coincidence of their communication contents. Conversely, when the handle information is not transmitted from the lens controller 111, the camera controller 124 can detect a communication error.

In this process, when the camera controller 124 detects the reset-requiring communication error, the camera controller 124 has to transmit, to the lens controller 111, a notice instructing the communication reset process to cause the lens controller 111 to perform the communication reset process. The notice instructing the communication reset process is hereinafter referred to as "a communication reset notice".

Instead of transmitting the communication reset notice, the camera controller 124 may turn on the image stabilization operation again after turning it off once. On the other hand, when the lens controller 111 performs the communication reset process according to the communication reset notice, the camera controller 124 does not turn off the image stabilization operation, and keeps the image stabilization operation performed to continue control thereof.

Furthermore, when the lens controller 111 performs the communication reset process, the camera controller 124 cannot receive, during the communication reset process, information on the image stabilization from the lens controller 111. Thus, as described above, the controller 111 and the camera controller 124 cannot cooperatively perform the optical image stabilization and the electronic image stabilization. Accordingly, while the lens controller 111 is performing the communication reset process, the optical image stabilization may only be performed in the lens unit L.

Although each of the above embodiments described the case where the accessory apparatus is the lens apparatus, other accessory apparatuses such as an illumination apparatus (such as a flash unit), which are detachably attachable to an image-capturing apparatus and are capable of communicating therewith may be used.

According to each of the above embodiments, when the communication error has occurred between the accessory apparatus and the image-capturing apparatus that are capable of communicating with each other, the normal communication-enabled state can be quickly restored.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-165619, filed on Aug. 26, 2016, which is hereby incorporated by reference herein in its entirety.

What is claimed is:

1. An accessory apparatus detachably attachable to an image-capturing apparatus, the accessory apparatus comprising at least one processor or circuit programmed to function as:
    an accessory communicator configured to enable communication with the image-capturing apparatus;
    an accessory controller configured to perform the communication with the image-capturing apparatus through the accessory communicator;
    an accessory shake detector configured to detect an accessory shake as a shake of the accessory apparatus; and
    an accessory image stabilizer configured to perform, depending on the accessory shake, an accessory image-stabilizing operation for reducing image blur, and to produce image stabilization information used by the image-capturing apparatus for a camera image-stabilizing operation for reducing the image blur,
    wherein the accessory controller is configured, in response to detecting an error in the communication before transmitting the image stabilization information to the image-capturing apparatus, to transmit an error notice that notifies the image-capturing apparatus of the error, and to perform a communication restoration process for restoring the communication, without waiting for a response to the error notice from the image-capturing apparatus.

2. An accessory apparatus according to claim 1, wherein the communication restoration process clears information received from the image-capturing apparatus and held in the accessory controller.

3. An accessory apparatus according to claim 1, wherein the accessory controller is configured to determine whether or not the detected error requires the communication restoration process, to perform the communication restoration process in a case where the accessory controller determines that the detected error requires communication restoration process, and is configured, in a case where the accessory controller determines that the detected error does not require the communication restoration process, to transmit the error notice to the image-capturing apparatus without performing the communication restoration process.

4. An accessory apparatus according to claim 3, wherein the accessory controller is configured, when the error continuously occurs, to determine that the communication restoration process is required, and is configured, when the error does not continuously occur, to determine that the communication restoration process is not required.

5. An accessory apparatus according to claim 1, wherein the accessory controller is configured, during performing the communication restoration process, to cause the accessory image stabilizer to perform the accessory image-stabilizing operation without producing the image stabilization information.

6. An accessory apparatus according to claim 1, wherein the accessory controller is configured to determine whether or not the detected error requires the communication restoration process, to transmit an first error notice that notifies the error to the image-capturing apparatus in a case where the accessory controller determines that the detected error requires the communication restoration process, and is configured, in a case where the accessory controller determines that the detected error does not require the communication restoration process, to transmit a second error notice that notifies the error to the image-capturing apparatus.

7. An accessory apparatus according to claim 1,
    wherein the accessory controller is configured to, from the image-capturing apparatus
        receive information on a reference time via a first communication and
        receive information on a relative time period from the reference time via a second communication, and
    wherein the accessory controller is configured to acquirer information on the accessory shake detected by the accessory shake detector at a time determined by the reference time and the relative time period.

8. An accessory apparatus according to claim 7, wherein the accessory image stabilizer is configured to perform the accessory image-stabilizing operation based on the information on the accessory shake acquired by the accessory controller.

9. An image-capturing apparatus to which an accessory apparatus is detachably attachable, the image-capturing apparatus comprising at least one processor or circuit programmed to function as:
    a camera communicator configured to enable communication with the accessory apparatus;
    a camera controller configured to perform the communication with the accessory apparatus through the camera communicator; and a camera image stabilizer configured to perform, using image stabilization information produced by the accessory apparatus depending on a shake of the accessory apparatus, a camera image-stabilizing operation for reducing image blur, wherein the camera controller is configured, in response to receiving from the accessory apparatus an error notice that notifies the camera controller of an error in the communication before receiving the image stabilization information from the accessory apparatus, to allow the accessory apparatus to perform a communication restoration process for restoring the communication, without transmitting a response to the error notice to the accessory apparatus.

10. An image-capturing apparatus according to claim 9, wherein the camera controller is configured, in response to detecting the error, to transmit a notice that instructs the accessory apparatus to perform the communication restoration process.

11. An image-capturing apparatus according to claim 9, wherein the camera controller is configured not to perform, immediately after receiving the error notice, a communication for requesting the image stabilization information.

12. An image-capturing apparatus according to claim 9, wherein the camera controller is configured to set a first time, and wherein the camera communicator is configured to, to the accessory apparatus transmit information on a reference time via a first communication and transmit information on a relative time period from the reference time to the first time via a second communication.

13. An image-capturing system including an image-capturing apparatus and an accessory apparatus detachably attachable to the image-capturing apparatus, wherein:

the accessory apparatus comprises at least one processor or circuit programmed to function as:

an accessory communicator configured to enable communication with the image-capturing apparatus;

an accessory controller configured to perform the communication with the image-capturing apparatus through the accessory communicator an accessory shake detector configured to detect an accessory shake as a shake of the accessory apparatus; and an accessory image stabilizer configured to perform, depending on the accessory shake, an accessory image-stabilizing operation for reducing image blur, and to produce image stabilization information used by the image-capturing apparatus for a camera image-stabilizing operation for reducing the image blur; and the image-capturing apparatus comprises at least one processor or circuit programmed to function as:

a camera communicator configured to enable communication with the accessory apparatus; and a camera controller configured to perform the communication with the accessory apparatus through the camera communicator, and wherein:

the accessory controller is configured, in response to detecting an error in the communication before transmitting the image stabilization information to the image-capturing apparatus, to transmit an error notice that notifies the image-capturing apparatus of the error;

the camera controller is configured not to transmit a response to the error notice to the accessory apparatus; and the accessory controller is configured to perform a communication restoration process for restoring the communication, without waiting for the response from the image-capturing apparatus.

14. A communication control method for an accessory apparatus detachably attachable to an image-capturing apparatus, the method comprising the steps of:

causing the accessory apparatus to perform communication with the image-capturing apparatus;

causing the accessory apparatus to detect an accessory shake as a shake of the accessory apparatus;

causing the accessory apparatus to perform, depending on the accessory shake, an accessory image-stabilizing operation for reducing image blur, and to produce image stabilization information used by the image-capturing apparatus for a camera image-stabilizing operation for reducing the image blur; and causing the accessory apparatus, in response to detecting an error in the communication before causing the accessory apparatus to transmit the image stabilization information to the image-capturing apparatus, to transmit an error notice that notifies the image-capturing apparatus of the error, and to perform a communication restoration process for restoring the communication, without causing the accessory apparatus to wait for a response to the error notice from the image-capturing apparatus.

15. A communication control method for an image-capturing apparatus to which an accessory apparatus is detachably attachable, the method comprising the steps of: causing the image-capturing apparatus to perform communication with the accessory apparatus; causing the image-capturing apparatus to perform, using image stabilization information produced by the accessory apparatus depending on a shake of the accessory apparatus, a camera image-stabilizing operation for reducing image blur, and causing the image-capturing apparatus, in response to receiving from the accessory apparatus an error notice that notifies the camera controller of an error in the communication before causing the image-capturing apparatus to receive the image stabilization information from the accessory apparatus, to allow the accessory apparatus to perform a communication restoration process for restoring the communication, without causing the image-capturing apparatus to transmit a response to the error notice to the accessory apparatus.

16. A non-transitory storage medium storing a computer program for causing a computer to execute a control method of controlling an accessory apparatus detachably attachable to an image-capturing apparatus, the method comprising the steps of:

causing the accessory apparatus to perform communication with the image-capturing apparatus;

causing the accessory apparatus to detect an accessory shake as a shake of the accessory apparatus;

causing the accessory apparatus to perform, depending on the accessory shake, an accessory image-stabilizing operation for reducing image blur, and to produce image stabilization information used by the image-capturing apparatus for a camera image-stabilizing operation for reducing the image blur; and causing the accessory apparatus, in response to detecting an error in the communication before causing the accessory apparatus to transmit the image stabilization information to the image-capturing apparatus, to transmit an error notice that notifies the image-capturing apparatus of the error, and to perform a communication restoration process for restoring the communication, without causing the accessory apparatus to wait for a response to the error notice from the image-capturing apparatus.

17. A non-transitory storage medium storing a computer program for causing a computer to execute a control method of controlling an linage-capturing apparatus to which an accessory apparatus is detachably attachable, the method comprising the steps of: causing the image-capturing apparatus to perform communication with the accessory apparatus; causing the image-capturing apparatus to perform, using image stabilization information produced by the accessory apparatus depending on a shake of the accessory apparatus, a camera image-stabilizing operation for reducing image blur, and causing the image-capturing apparatus, in response to receiving from the accessory apparatus an error notice that notifies the camera controller of an error in the communication before causing the image-capturing apparatus to receive the image stabilization information from the accessory apparatus, to allow the accessory apparatus to perform a communication restoration process for restoring the communication, without causing the image-capturing apparatus to transmit a response to the error notice to the accessory apparatus.

* * * * *